United States Patent [19]

Soldanski et al.

[11] Patent Number: 4,659,494

[45] Date of Patent: Apr. 21, 1987

[54] CARPET CLEANING COMPOSITION CONTAINS A CELLULOSE POWDER FROM A HARDWOOD SOURCE

[75] Inventors: Heinz-Dieter Soldanski, Essen; Bernd-Dieter Holdt; Ursula Meier, both of Duesseldorf, all of Fed. Rep. of Germany

[73] Assignee: Henkel Kommanditgesellschaft auf Aktien, Duesseldorf, Fed. Rep. of Germany

[21] Appl. No.: 768,525

[22] Filed: Aug. 22, 1985

[30] Foreign Application Priority Data

Oct. 13, 1984 [DE] Fed. Rep. of Germany ....... 3437629

[51] Int. Cl.[4] .............................................. C09K 3/22

[52] U.S. Cl. ...................................... 252/88; 252/139; 252/140; 252/163; 252/168; 252/174.17; 252/174.25

[58] Field of Search ............ 252/88, 139, 140, 174.17, 252/174.25, 163, 168

[56] References Cited

U.S. PATENT DOCUMENTS

| | | | |
|---|---|---|---|
| 2,165,586 | 7/1939 | Studer et al. | 252/88 |
| 2,344,268 | 3/1944 | Rench | 252/384 |
| 3,240,713 | 3/1966 | Hulsh | 252/99 |
| 3,418,243 | 12/1968 | Hoxie | 252/154 |
| 3,630,919 | 12/1971 | Sheaffer et al. | 252/88 |
| 4,440,661 | 4/1984 | Takeuchi et al. | 252/89.1 |

FOREIGN PATENT DOCUMENTS

| | | |
|---|---|---|
| 2544605 | 4/1976 | Fed. Rep. of Germany . |
| 2001099 | 1/1979 | United Kingdom . |
| 2134917 | 8/1984 | United Kingdom . |

OTHER PUBLICATIONS

Translation of "Technocel"-C.F.F. Cellulose-Fullstoff-Fabrik Fleenerweg 2, D-4050 Moenchengladbach 1.

*Primary Examiner*—Paul Lieberman
*Assistant Examiner*—Hoa Van Le
*Attorney, Agent, or Firm*—Ernest G. Szoke; Henry E. Millson, Jr.; Mark A. Greenfield

[57] ABSTRACT

Powder-form compositions containing as its principal components cellulose powder, organic solvents, and water. The compositions are suitable for cleaning textiles, particularly carpets, and are distinguished by high cleaning power and minimal dust generation.

14 Claims, No Drawings

CARPET CLEANING COMPOSITION CONTAINS A CELLULOSE POWDER FROM A HARDWOOD SOURCE

BACKGROUND OF THE INVENTION

1. Field of the Invention

This invention relates to a scatterable composition for the dry cleaning of textiles, particularly carpets, which contains cellulose powder as an adsorbent.

2. Description of Related Art

In addition to shampoos, powder-form cleaning compositions have recently been used to an increasing extent for cleaning carpets and other textile coverings in situ, which has the advantage of not leaving any ridges and drying more quickly. Cleaning powders of this type contain as their principal constituents surfactants and adsorbents and also relatively large quantities of water in loosely bound form. It is assumed that the surfactants, together with the water present, are responsible for detaching the dirt particles from the fibers and transporting them to the adsorbent which, after evaporation of the water, is removed together with the soil by brushing or vacuum cleaning. Various materials have been proposed as adsorbents, including for example diatomaceous earth, fuller's earth, talcum, sawdust, ground cork and ground corncobs (U.S. Pat. No. 3,418,243), bleached wood powder particularly maple (Swiss Pat. No. 461,685) and finely divided silica (U.S. Pat. No. 3,630,919).

Of these adsorbents, only wood powders have acquired any real practical significance, although cleaning powders containing wood powder as adsorbents are not always satisfactory in their cleaning power and are very dingy in color, even where bleached wood powders are used.

More recent developments resulted in the proposal to use zeolite powder or synthetic resin foam powders, particularly powders of urea-formaldehyde foams, as adsorbents. Cleaning compositions based on adsorbents such as these are colorless and, in some cases, have a much better cleaning effect than products based on sawdust, although they also show certain disadvantages. Thus, the cleaning compositions according to German application No. 25 44 605, which contain the naturally very finely divided zeolite as adsorbent, tend to generate dust in abundance and to discolor the carpets while compositions based on urea-formaldehyde resin (UFR), of the type described in British Pat. No. 2,001,099 and in British Pat. No. 2,134,917, necessitate a number of special additives and measures during their application to restrict the emission of formaldehyde to an acceptable level. Proposals to add these adsorbents onto inert carrier materials (cf. European Pat. application No. 62 536 and U.S. Pat. No. 4,440,661) have had no effect on those disadvantages.

DESCRIPTION OF THE INVENTION

Other than in the operating examples, or where otherwise indicated, all numbers expressing quantities of ingredients or reaction conditions used herein are to be understood as modified in all instances by the term "about".

Accordingly, an object of the present invention is to provide a dry cleaning composition for textiles which, on the one hand, has a high cleaning power, but which on the other hand avoids the disadvantages attending known compositions.

According to the invention, this object is achieved by a dry cleaning composition which contains an adsorbent, water, and organic solvents, is free from zeolite and urea-formaldehyde resin, and contains cellulose powder having a particle size of from 1 to 150 μm as the adsorbent.

The compositions of the invention are colorless, dry to slightly moist, readily scatterable powders which have a high cleaning power, generate very little dust on application and are storable. They do not result in discoloration, even when used on dark textiles. Another surprising benefit of the present invention is that the use of surfactants in the cleaning compositions can be greatly reduced and, in many cases, omitted altogether.

The cellulose powders suitable for use in accordance with the invention are obtained from commercial cellulose, which is generally obtained from vegetable sources, more particularly from wood, by size-reduction using mechanical and/or chemical processes. Powders such as these, which are colorless and substantially free from lignin and other impurities associated with the vegetable material, are commercially available in different finenesses, although it is only the finer types with particle sizes of from 1 to 150 μm that are suitable for the purposes of the invention. A particularly high cleaning power is developed by compositions containing cellulose powder having a particle size of from 1 to 90 μm and preferably from 5 to 50 μm. Accordingly, these compositions are preferred.

Particle size can be determined by various methods, for example by air jet sifting. The particle sizes quoted in this specification are based on measurements using the elutriation process according to DIN German Industrial Norm. 53,580. which can be carried out with minimal experimental involvement and of which the results largely agree with those obtained by air jet sifting.

Surprisingly, the origin of the cellulose also affects the quality of the textile cleaning compositions produced with the powder. Thus, cleaning compositions produced with powders of hardwood cellulose, particularly beechwood cellulose, are distinguished by particularly high cleaning power, with the result that these powders are preferably used in the compositions of the invention. In addition, of these powders, it is particularly preferred to use those types which are readily produced by purely mechanical methods, for example by grinding.

The proportion of adsorbent, which consists predominantly, but preferably completely, of cellulose powder, in the compositions of the invention is preferably from 35 to 70% by weight and, more preferably, from 45 to 55% by weight. In addition to cellulose, the compositions of the invention can contain smaller quantities of adsorbents of the type commonly used in dry cleaning compositions, for example starch powder or bentonite, providing they do not adversely affect the properties of the compositions. Ground foam glass (Perlite) has been successfully used as an additional adsorbent which also imparts volume to the compositions.

In addition to the adsorbents, the cleaning compositions of the invention contain water and certain organic solvents.

The quantity in which these liquids are used is gauged in such a way that it can still be absorbed by the solid constituents of the compositions, i.e. in particular by the cellulose powder, so that the scatterability of the compositions is not affected. The water content, which is made up of the water added during production and of the water already present in the starting materials, amounts preferably to between 25 and 60% by weight and more preferably to between 30 and 40% by weight.

Suitable organic solvents can be water-miscible or water-immiscible solvents, providing they do not attack the textiles and are sufficiently volatile to evaporate in the required time after the compositions have been applied to the textiles. Another factor to be borne in mind when selecting the solvents is that they should have sufficiently high flash points in the final product mixture and should be toxicologically safe. Suitable solvents are alcohols, ketones, glycol ethers and hydrocarbons, for example isopropanol, acetone, ethers of mono- and diethylene glycol and mono-, di- and tripropylene glycol boiling at temperatures of from 120° C. to 250° C. and petroleum fractions boiling at temperatures of from 130 to 200° C. and also mixtures of these solvents. Alcohols containing from 2 to 3 carbon atoms, propylene glycol ether, petroleum fractions, and mixtures thereof are preferred. The proportion of organic solvent is preferably from 5 to 22% by weight and more preferably from 10 to 15% by weight, based on the cleaning composition as a whole.

As further optional constituents, the compositions of the invention can contain surfactants. Whereas a very good surface cleaning effect comparable with the result obtained with commercial compositions is achieved, and the compositions generate surprisingly little dust even without the addition of surfactants, the removal of fatty stains can be further improved by the addition of surfactants. In general, an addition of up to 4% by weight of surfactant is sufficient, the compositions preferably containing from 0.05 to 1% by weight of surfactant. Of the large number of known surfactants, compounds which, together with the cellulose powder and any other involatile constituents present in the compositions, dry to form a solid, friable residue are particularly suitable. The surfactants can be selected from anionic and nonionic types, anionic surfactants being preferred.

Suitable nonionic surfactants for the compositions of the invention are, in particular, adducts of from 1 to 30 moles and preferably from 4 to 15 moles of ethylene oxide with 1 mole of a $C_{10}$–$C_{20}$ compound which is an alcohol, an alkyl phenol, a carboxylic acid, or a carboxylic acid amide. Particularly desired are the adducts of ethylene oxide with long-chain primary or secondary alcohols, such as for example fatty alcohols or oxoalcohols, and also with mono- or dialkylphenols containing from 6 to 14 carbon atoms in the alkyl groups.

Suitable anionic surfactants are, in particular, those of the sulfate or sulfonate type, although other types can also be employed, such as soaps, long-chain N-acyl sarcosinates, salts of fatty acid cyanamides or salts of ether carboxylic acids, of the type obtainable from long-chain alkyl or alkylphenyl polyglycol ethers and chloroacetic acid. The anionic surfactants are preferably used in the form of the sodium salts.

Particularly suitable surfactants of the sulfate type are the sulfuric acid monoesters of long-chain primary alcohols of natural and synthetic origin containing from 10 to 20 carbon atoms, i.e. fatty alcohols, such as for example coconut oil fatty alcohols, tallow fatty alcohols, oleyl alcohol, or $C_{10}$–$C_{20}$-oxo-alcohols and those of secondary alcohols having the same chain lengths. Other suitable surfactants of the sulfate type are sulfuric acid monoesters of aliphatic primary alcohols, secondary alcohols or alkylphenols ethoxylated with from 1 to 6 moles of ethylene oxide. Sulfated fatty acid alkanolamides and sulfated fatty acid monoglycerides are also suitable.

Surfactants of the sulfonate type are, primarily, sulfosuccinic acid mono- and diesters containing from 6 to 22 carbon atoms in the alcohol portions, alkylbenzene sulfonates containing $C_9$–$C_{15}$ alkyl groups and esters of -sulfofatty acids, for example the sulfonated methyl or ethyl ester of hydrogenated coconut oil, palm kernel oil or tallow fatty acids. Other suitable surfactants of the sulfonate type are the alkane sulfonates obtainable from $C_{12}$–$C_{18}$ alkanes by sulfochlorination or sulfoxidation, followed by hydrolysis or neutralization, or by the addition of bisulfites onto olefins, and also olefin sulfonates, i.e. mixtures of alkene and hydroxyalkane sulfonates and disulfonates of the type obtained, for example, from long-chain monoolefins containing a terminal or internal double bond by sulfonation with gaseous sulfur trioxide, followed by alkaline or acidic hydrolysis of the sulfonation products.

$C_{12}$–$C_{18}$ fatty alcohol sulfates, the salts of sulfosuccinic acid monoesters containing from 16 to 20 carbon atoms in the alcohol portion and mixtures of these surfactants are particularly preferred.

In addition to the constituents already mentioned, the compositions according to the invention can optionally contain small quantities of other additives and auxiliaries of the type commonly used in textile and carpet cleaning compositions, such as for example antistatic agents, optical brighteners, resoiling inhibitors, scattering promoters, preservatives and perfume. It is best, especially when dust-generating components are to be incorporated in the compositions, to add small quantities of waxes or oils as dust binders. Short textile or cellulose fibers with lengths of from 200 to 1000 μm can be added in order to impart more volume to the composition. Normally, these auxiliaries and additives are used in a total quantity of no more than 5% by weight and preferably in a total quantity of no more than 2% by weight, based on the composition as a whole.

The production of the compositions benefits considerably from the fact that they consist of only a few components, so that technically simple, mostly single-stage processes can be used. Simple mixers, such as paddle mixers or drum mixers, are normally used. The cellulose powder and, optionally, other finely divided solid components are initially introduced into the mixer in which they are then sprayed while mixing with the liquids optionally containing other constituents in dissolved form. Depending on the mechanics involved and also on their constitution, the compositions can thus be produced in very finely divided form or even in more or less agglomerated form, although the constitution of the compositions always guarantees that even the agglomerated forms disintegrate readily on the textiles without any need for significant mechanical forces to be applied. By using flaky agglomerates, the fluidity of the compositions may be reduced to the point where they become extremely thick-flowing products, preferred for certain applications.

The powder density of the compositions can also be influenced to a certain extent in the production process by using more or less compact agglomerates. Thus, the compositions normally have powder densities of from 200 to 350 g/l, with the result that relatively large volumes are applied per unit area. This facilitates uniform distribution, particularly when the compositions are scattered over carpets by hand.

Textiles and carpets are cleaned by scattering the cleaning compositions according to the invention onto the textiles either by hand or by means of a suitable appliance and then rubbing them more or less intensively into the textiles, for example by means of a sponge or brush. In general, the rubbing-in times are between 0.5 and 2.5 minutes and preferably between 0.5 and 1.5 minutes per square meter. After the compositions have been rubbed in, the textiles are left to dry until the compositions which combine with the dirt have changed into dry residues. These residues are then removed from the textiles mechanically, for example by brushing out or by vacuum cleaning. For the surface cleaning of textiles, the compositions of the invention are used in quantities of from 20 to 200 g/m$^2$, depending on the fullness of the textiles and their degree of soiling, although they can also be locally applied in larger quantities for removing individual stains. For the surface cleaning of carpets, the compositions of the invention are normally used in quantities of from 50 to 150 g/m$^2$. The process as a whole can be carried out largely by hand, for example in the home, although it is also possible to carry out the rubbing-in step and, optionally other steps by means of suitable appliances, for example combined scattering and brushing machines, so that the process is equally suitable for use on an industrial scale.

The invention will be illustrated but not limited by the following examples.

EXAMPLES

1. A dry cleaning composition was prepared from the following components in a paddle mixer:

65.0 kg of beechwood cellulose powder, Technocel 30 (fiber length 5–30 μm, water content 4%)

15.6 kg of synthetic isoparaffin (boiling range 155–173° C.)

2.6 kg of isopropanol 1.3 kg of a surfactant mixture of sodium lauryl sulfate and disodium sulfosuccinic acid monoester of ricinoleic acid ethanolamide (1:1)

46.0 kg of water 0.20 kg of perfume 0.03 kg of preservative (isothiazoline derivative).

The colorless, slow-flowing, but readily scatterable powder had a weight per liter of 270 g and was readily stored in plastic bags.

2. A cleaning composition was prepared in the same way as in Example 1, the only difference being that a coarser beechwood cellulose powder (particle size 10–90 μm) was used.

3. A cleaning compositon was prepared in the same way as in Examples 1 and 2, the only difference being that an even coarser beechwood cellulose powder (particle size 10–150 μm) was used.

4. A cleaning composition was prepared in the same way as in Example 1, the only difference being that spruce wood cellulose powder (technocel 50 F.) was used.

5. A cleaning composition was prepared in the same way as in Example 1, except that it did not contain any surfactant for otherwise the same composition.

6. Determination of cleaning power

Cleaning was tested on fitted carpets both by hand and also by machine, two commercial compositions based on wood powder and urea-formaldehyde resin foam powder and a conventional zeolite-containing composition being used for comparison. In every case, the quantity applied was 100 g/m$^2$.

(a) Machine application

A test dirt mix of grease, quartz powder, aluminum oxide, iron oxide and carbon black suspended in white spirit was uniformly sprayed onto a beige-colored polyamide pile carpet, rolled in and dried. The cleaning compositions were scattered onto the test carpets thus prepared and rubbed in immediately afterwards for about 60 seconds per square meter by means of an electrically driven, rotating round brush. After drying, which took about 2 hours, the carpets were thoroughly treated with a vacuum cleaner (about 1 minute per square meter). Cleaning power was optically determined by measuring the degree of lightening in a remission meter. Table 1 shows the results in the form of color intervals (DE) relative to the unsoiled carpet.

(b) Manual application

The test dirt mix used consisted of 85% by weight of the sieved contents of a vacuum cleaner bag and of 15% by weight of a standard mixture of kaolin, quartz powder, iron oxide and carbon black. It was applied to pieces of beige-colored polyamide pile carpet by introducing the carpet and dirt together into a closed drum and rotating the drum after the addition of steel beads until the dirt had been uniformly distributed.

For cleaning, the pieces of carpet were scattered with cleaning composition (100g/m$^2$) and then manually treated for about 10 seconds using a medium-hard brush with polypropylene bristles. After drying, the residues were removed by means of a hand vacuum cleaner. Evaluation was carried out in the same way as in a), the results being shown in Table 1.

TABLE 1

| Cleaning composition | Method a | Method b |
|---|---|---|
| None | 37 | 18 |
| Example 1 | 15 | 3 |
| Example 2 | 18 | 7 |
| Example 3 | 21 | 10 |
| Example 4 | 22 | 10 |
| Example 5 | 15 | 3 |
| Commercial product based on wood powder | 24 | 12 |
| Commercial product based on UFR-powder | 24 | 12 |
| Product of EP 62 536 (Example 1) | 26 | 14 |

The results reflect the high cleaning power of the compositions of the invention which, in this respect, are equivalent or distinctly superior to those obtained with conventional compositions.

7. Determination of dust generation

During the vacuuming step of cleaning by machine (Example 6*a*), the dust content of the air was gravimetrically determined at two levels above the carpet by means of a dust collector (Gravikon VC 25, collection time 30 secs.).

Table 2 shows the values obtained in mg of dust per m$^3$ of air.

TABLE 2

| Cleaning composition | Measuring level 43 cm | Measuring level 150 cm |
|---|---|---|
| Example 1 | 0.90 | 0.90 |
| Example 5 | 0.30 | 0.30 |
| Commercial product based on UFR-powder | 1.40 | 0.80 |
| Commercial product based on wood powder | 1.30 | 1.20 |
| Product of EP 62 536 (Example 1) | 1.80 | 1.70 |

These values clearly show that the compositions of the invention generate very little dust, even compared with conventional compositions.

8. Determination of discoloration

The discoloring effect of the cleaning compositions was tested on pieces of dark red carpet which, although not artificially soiled, had been treated with the cleaning compositions in the same way as described in Example 6b. The effect could be semi-quantitatively determined by visual comparison with untreated pieces of carpet and evaluated on a points scale (1 =unchanged, 5 =very seriously discolored). The compositions of Examples 1 to 5 according to the invention did not produce any discoloration (1), whereas the composition according to EP 62 536, Example 1, was awarded 2 to 3 points on evaluation.

What is claimed is:

1. In a powder-form dry cleaning composition for textiles which is free from zeolites and urea-formaldehyde resin, and which consists essentially of about 35–70% of an adsorbent, about 25–60% of water, and about 5–22% of an organic solvent, the improvement wherein said adsorbent is predominately a cellulose powder derived from a hardwood cellulose having a particle size of from about 5 to about 50 μm is present therein, said cellulose powder being essentially colorless and substantially free from lignin and other impurities associated with the hardwood sources, all percentages being by weight based upon the total composition.

2. A dry cleaning composition in accordance with claim 1 wherein the cellulose powder is derived from the mechanical size reduction of beechwood cellulose.

3. A dry cleaning composition in accordance with claim 1 wherein the composition also contains a surfactant.

4. A dry cleaning composition in accordance with claim 1 wherein the cellulose powder is the only adsorbent present therein.

5. A powder-form dry cleaning composition for cleaning textiles which is free from zeolites and urea-formaldehyde resins consisting essentially of:

A. from about 35 to about 70% by weight of at least one cellulose powder derived from a hardwood cellulose having a particle size in the range of from about 5 to about 50 μm, said cellulose powder being essentially colorless and substantially free from lignin and other impurities associated with the hardwood sources, B. from about 25 to about 60% by weight of water, C. from about 5 to about 22% by weight of at least one organic solvent, D. from 0 to 4% by weight of at least one anionic and/or nonionic surfactant, and E. from 0 to 5% by weight of other dry cleaning composition additives.

6. A powder-form dry cleaning composition in accordance with claim 5 wherein the following quantities of ingredients are present:

Component A—from about 45 to about 55% by weight,
Component B—from about 30 to about 40% by weight,
Component C—from about 10 to about 15% by weight,
Component D—from about 0.05 to about 1% by weight, and
Component E—from 0 to about 2% by weight.

7. A dry cleaning composition in accordance with claim 5 wherein the cellulose powder in A. is derived from the mechanical size reduction of beechwood cellulose.

8. A dry cleaning composition in accordance with claim 5 wherein the cellulose powder in A. is the only adsorbent present in the composition.

9. A dry cleaning composition in accordance with claim 5 wherein the organic solvent in C. is one or more of a $C_2$-$C_3$ alcohol, propylene glycol, and a petroleum fraction.

10. A dry cleaning composition in accordance with claim 5 wherein component D. is an anionic surfactant which is at least one of a fatty alcohol sulfate containing from 12 to 18 carbon atoms and a monoalkyl sulfosuccinate containing from 16 to 22 carbon atoms in the alcohol portion thereof.

11. A method for cleaning textiles comprising the steps of a. applying to the textile the dry cleaning composition of claim 1 in a quantity of from about 20 to about 200 g/m$^2$, b. rubbing the composition of claim 1 into the textile for from about 0.5 to about 2.5 minutes per square meter, c. after the composition of claim 1 has dried, mechanically removing the composition of claim 1 and any dirt mixed with or adhering thereto from the textile.

12. A method in accordance with claim 11 wherein in step a. the composition of claim 1 is used in a quantity of from about 50 to about 150 g/m$^2$.

13. A method in accordance with claim 12 wherein in step b. the composition of claim 1 is rubbed into the textile for from about 0.5 to about 1.5 minutes/m$^2$.

14. A method in accordance with claim 11 wherein the textile is a carpet.

* * * * *